United States Patent [19]
Sato et al.

[11] Patent Number: 5,366,718
[45] Date of Patent: Nov. 22, 1994

[54] PROCESS FOR PRODUCING COLUMBITE-TYPE NIOBATE AND PROCESS FOR PRODUCING PEROVSKITE-TYPE COMPOUND THEREFROM

[75] Inventors: Teiji Sato; Hitoshi Nakata; Takayuki Ishizuki; Shoichi Iwaya; Koji Takahashi; Yuuiti Sannohe; Hitoshi Tanaka, all of Tokyo, Japan

[73] Assignees: Mizusawa Industrial Chemicals Ltd.; TDK Corporation, both of Tokyo, Japan

[21] Appl. No.: 149,956

[22] Filed: Nov. 10, 1993

[30] Foreign Application Priority Data

Nov. 10, 1992 [JP] Japan .................. 4-323819

[51] Int. Cl.$^5$ .................. C01G 21/00; C01G 33/00
[52] U.S. Cl. .................. 423/594; 423/593; 423/595; 501/134; 501/135
[58] Field of Search .................. 423/593, 594, 595; 501/134, 135

[56] References Cited

U.S. PATENT DOCUMENTS

| | | | |
|---|---|---|---|
| 5,180,699 | 1/1993 | Terada et al. | 423/593 |
| 5,229,101 | 7/1993 | Watanabe et al. | 423/593 |
| 5,288,474 | 2/1994 | Reichert et al. | 423/593 |

FOREIGN PATENT DOCUMENTS

| | | | |
|---|---|---|---|
| 83628 | 4/1986 | Japan . | |
| 61-83628 | 4/1986 | Japan | 423/593 |
| 63-95119 | 4/1988 | Japan | 423/593 |
| 34890 | 8/1990 | Japan . | |
| 2-279523 | 11/1990 | Japan | 423/593 |

Primary Examiner—Jack Cooper
Attorney, Agent, or Firm—Sherman and Shalloway

[57] ABSTRACT

A process for producing a columbite-type niobate and a process for producing a niobium-containing lead-type perovskite compound using the columbite-type niobate. A precursor slurry of a columbite compound composed of a fresh niobium hydroxide, a metal acetate and ammonium aqueous solution is spray-dried, and is calcined at 500° C. or higher to obtain a crystalline columbite-type compound having grain sizes of 1 μm or smaller to which was then mixed a lead component. The mixture is calcined, pulverized and is sintered at a temperature of 800° to 1100° C. to synthesize a highly dielectric material of a niobium-containing lead-type composite perovskite. The precursor of columbite is calcined at 500° to 1100° C. to obtain fine columbite-type niobate crystals of grain sizes of 1 μm or smaller. A lead-type perovskite compound using the above crystals can be sintered at a temperature of as low as 950° C. or lower, and the sintered product thereof has a homogeneous and fine texture and excellent dielectric properties that could not be obtained by the conventional solid-phase process.

11 Claims, 6 Drawing Sheets

×15,000 ―― 1μm

×15,000 ―― 1μm x2.000 —— 10μm x2.000 —— 10μm

PROCESS FOR PRODUCING COLUMBITE-TYPE NIOBATE AND PROCESS FOR PRODUCING PEROVSKITE-TYPE COMPOUND THEREFROM

BACKGROUND OF THE INVENTION

1. Field of the Invention

The present invention relates to a process for producing a columbite-type niobate and a process for producing a niobium-containing lead-type perovskite compound therefrom. More particularly, the invention relates to a process for producing which permits transition into columbite-type crystals and transition into perovskite-type crystals at relatively low temperatures.

2. Prior Art

Ceramic materials of the perovskite-type have been widely used as piezo-electric materials, pyroelectric materials and ferroelectric materials, and there have been used various perovskites having chemical compositions represented by a general formula (2), $$ABO_3 \qquad (2)$$

A representative example of the perovskite may be a niobium-containing lead-type perovskite such as a lead magnesium niobate (PMN) which is a composite perovskite in which the site A in the above formula (where M denotes a divalent or trivalent metal).

A so-called solid-phase process has been known for synthesizing a composite perovskite of this type, according to which MgO and $Nb_2O_5$ are mixed together using a ball mill and are reacted together at 1000° C. in solid phase to form an $MgNb_2O_6$ (columbite) which is then mixed together with PbO in a ball mill followed by calcining at 850° to 900° C. to prepare a perovskite-type lead magnesium niobate.

According to the above-mentioned process, however, the columbite that is formed and PbO react with each other in the solid phase at considerably high temperatures only at which, however, the PbO volatilizes, resulting in nonhomogeneous composition or making it difficult to accomplish the composition as desired.

In order to solve the above problem, Japanese Patent Publication No. 34890/1990 discloses a process for the preparation a composite perovskite crystal powder comprising adding an organic solvent and an alkali solution to the niobium pentachloride or the niobium alkoxide to form a niobium hydrogel, and adding one or more kinds of metal salt aqueous solutions thereto, followed by drying and calcination.

Furthermore, Japanese Laid-Open Patent Publication No. 83628/1986 discloses the preparation of a PMN perovskite by spraying into an electric furnace maintained at 1000° C. a solution that is obtained by mixing an acidic solution of oxalic acid of niobium and metal magnesium and the like together, calcining the resulting powder at 900° C. for three hours to obtain an $MgNb_2O_6$ single phase, mixing the $MgNb_2O_6$ single phase with PbO together in a pot mill, and calcining the mixture at 850° C. for one hour.

According to the former proposal, the PMN can be formed at a temperature which is considerably lower than that of the solid-phase process but still requiring a temperature of about 800° C. and making it necessary to handle the whole components inclusive of lead component in the form of solutions.

The latter proposal has an excellent idea in that the columbite is prepared by the wet-type process and the PMN is synthesized therefrom by the dry-type process making, however, it necessary to effect the processings at high temperatures such as decomposition at 1000° C. for forming the columbite, calcining at 900° C., and calcining into PMN at 850° C., thus leaving much room for improvement.

SUMMARY OF THE INVENTION

The object of the present invention therefore is to provide a process for producing columbite-type niobate which is capable of synthesizing a highly pure and homogeneous columbite-type niobate through the heat treatment at a relatively low temperature, and enables the formed columbite-type niobate to be changed into perovskite-type crystals when it is calcined together with a lead oxide at a temperature lower than the temperature of the prior art.

Another object of the present invention is to provide a process for producing a niobium-containing lead-type perovskite compound which features homogeneous composition and increased purity since it is calcined at a low temperature and serves as a dielectric having a higher dielectric constant than those of the conventional materials.

According to the present invention, there is provided a process for producing a columbite-type niobate which comprises mixing an aqueous slurry of fresh niobium hydroxide that is just formed, a metal acetate of a stoichiometric amount with respect to the niobium hydroxide and ammonia water together, spray-drying the mixture solution to form a powdery mixture, and calcining the powdery mixture.

According to the present invention, furthermore, there is provided a process for producing a niobium-containing lead-type perovskite compound comprising intimately mixing the columbite-type niobate obtained by the above-mentioned producing process and lead oxide at a stoichiometric ratio, and calcining the mixture.

According to the present invention there is provided a method for producing niobium-containing lead-type perovskite compounds such as $Pb(Mg \cdot Nb))_3$-type, $Pb(Fe \cdot Nb)O_3$-type and $Pb(Co \cdot Nb)O_3$-type compounds.

As a fresh aqueous slurry of niobium hydroxide, there can be preferably used the one obtained by dissolving niobium hydroxide in oxalic acid to which is then added ammonium aqueous solution to form a precipitate.

In the process for producing the columbite-type niobate according to the present invention, what is important is to use a fresh aqueous slurry of niobium hydroxide that is just formed as a starting material and a metal acetate in combination.

That is, the fresh niobium hydroxide that is just formed has a small degree of polymerization in the basic unit structure as compared with the aged niobium hydroxide and further has fine primary particles. The fresh niobium hydroxide which is a starting material can be easily changed into columbite-type crystals through calcining at a temperature which is as reatively low as, for example, 500° to 1100° C. Moreover, when fired being mixed with lead oxide, the thus formed columbite-type crystals can be easily changed into perovskite-type crystals through calcining at a temperature which is as relatively low as, for example, 600° to 700° C.

The freshness degree of niobium hydroxide used as the starting material is evaluated in terms of solubility in 6N sulfuric acid. Ordinary niobium hydroxide is sparingly soluble in mineral acids. The aged niobium hydroxide does not almost dissolve when it is added in an amount of 0.5 g as $Nb_2O_5$ in 40 ml of 6N $H_2SO_4$. However, the fresh niobium hydroxide used in the present invention completely dissolves in sulfuric acid under the above-mentioned condition.

Table 1 summarizes the features of the present invention from the working examples that will be described later. This Table shows the solubility of the starting niobium hydroxide in 6N sulfuric acid, Formation rate of the powdery columbite when the niobate is calcined at 900° C., the transition start temperature into the perovskite-type single-phase crystals when the mixture with PbO is calcined, and the sintering completion temperature. From Table 1, it is learned that the fresh niobium hydroxide used in the present invention offers a rate of forming columbite-type crystals which is as high as 100%, whereas the aged niobium hydroxide forms niobium pentoxide as a by-product and offers the formation rate of columbite-type crystals of as low as 60 to 75%. Moreover, the transition start temperature into the perovskite-type single-phase crystals and the sintering completion temperature are lower by about 200° C., which is an astonishing fact.

TABLE 1

| Niobium hydroxide soluble in 6N sulfuric acid | Formation rate (%) of columbite by calcining at 900° C. (sample No.) | Transition into perovskite-type crystals | |
|---|---|---|---|
| | | start temp. °C. | sintering completion temp. °C. |
| O(N-1) | 100 (MN-1) | 600 | 900 |
| X(NH-1) | 75 (MN-9) | 800 | 1100 |
| XX(NH-2) | 60 (MN-19) | 800 | 1200 |

In the present invention, use of the fresh niobium hydroxide as a starting material of niobium brings about such advantages that there exist no impurity ions compared with when a solution of a niobium compound is used such as when an acidic solution of oxalic acid of niobium is used or a solution of hydrofluoric acid is used, and, hence, no high-temperature processing is required for removing the impurity ions.

In the present invention, it is also important to use, in the form of an acetate, the metal component that is incorporated as a niobate. It is, of course, allowable to use a variety of inorganic acids and organic acids as acid radicals for constituting water-soluble metal salts. When acids other than acetic acid are used, however, the decomposition must be carried out at high temperatures, making it difficult to effect the transition into the columbite at a low temperature or to effect the transition into the perovskite at a low temperature.

In Table 2 appearing later, formation rates of the columbite through the calcining at 900° C. were measured in the same manner as described above by using a magnesium acetate and an acidic magnesium solution of oxalic acid as metal salts. It will be obvious that the use of the acetate helps accomplish 100% of formation rate of the columbite through calcining at 900° C.

According to the present invention, it is important to mix the acetate and the ammonium aqueous solution to the fresh slurry of niobium hydroxide from the standpoint of forming the columbite at a low temperature. That is, addition of the ammonium aqueous solution makes the mixture solution weakly alkaline to alkaline which helps lower the transition start temperature into the columbite. The relationship among the pH of the mixture solution, formation rate of the columbite-type niobate and the transition start temperature are explicitly shown in Table 4 and FIG. 1 appearing later.

According to the present invention, the thus-formed mixture solution is dried by such means as spray-drying into a powdery form. Though the fresh niobium hydroxide used in the present invention disperses well in an aqueous medium, there is a great difference in the specific gravity between the niobium hydroxide particles and the aqueous solution. Therefore, if the mixture solution is dried over an extended period of time, the composition becomes non-homogeneous due to the separation of the two components. According to the present invention, therefore, the mixture solution that is formed is spray-dried or freeze-dried into a powdery form maintaining homogeneous composition.

According to the present invention which calcines the powdery mixture, there is obtained a columbite-type metal niobate of a homogeneous composition without impurities, the primary particles thereof being as fine as in the order of submicrons. Moreover, since the calcining is effected at a low temperature, the particles do not grow into coarse ones and the degree of aggregation is small. FIG. 2 is a scanning-type electron microphotograph (magnification of 15,000 times) of the columbite-type metal niobate of the present invention.

The columbite-type metal niobate of the present invention is not only obtained through the calcining at a relatively low temperature but is also intimately mixed with lead oxide and can be changed into a niobium-containing lead-type perovskite compound through the calcining at a temperature considerably lower than the temperature of the prior art without forming pyrochroite and the like as by-products.

DESCRIPTION OF THE PREFERRED EMBODIMENTS

Preparation of Fresh Niobium Hydroxide

Figure 1A:
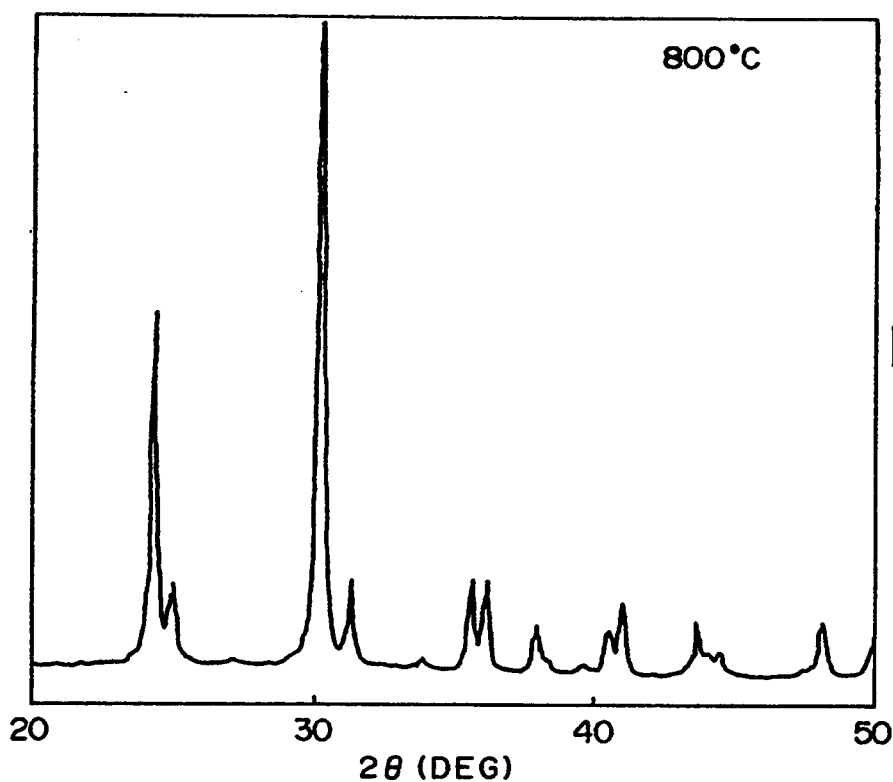
FIG. 1 is a diagram showing temperatures of calcining a columbite-type magnesium niobate ($MgNb_2O_6$) and X-ray diffraction patterns of calcined products of the present invention.
Figure 1B:
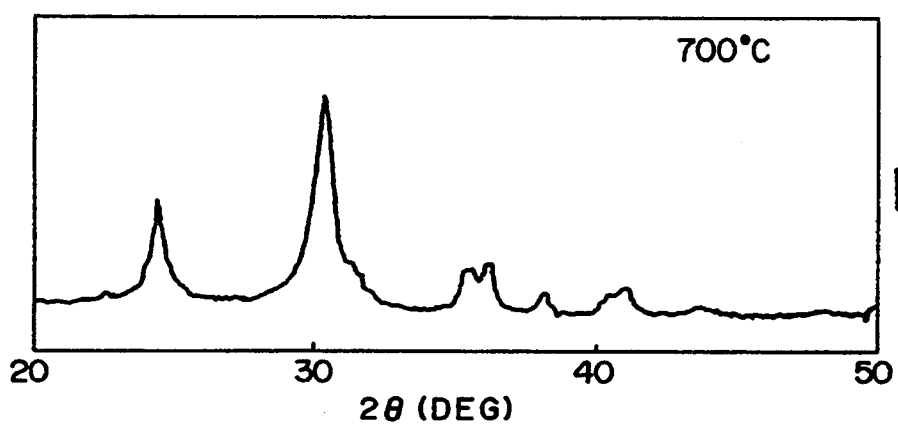
Figure 1C:
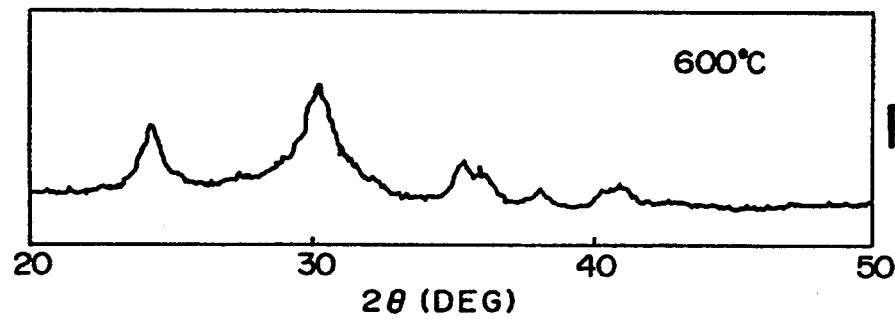
Figure 1D:
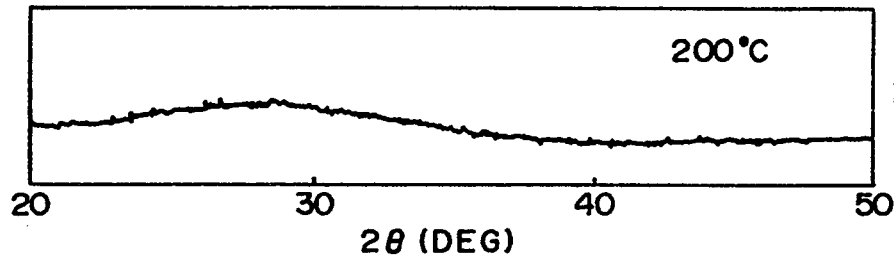

As niobates, there are available a niobium pentachloride, a niobium fluoride and the like. When these starting materials are used, however, the columbite that is formed is affected by impurity ions unless the calcining is effected at a high temperature to remove them. The present invention therefore uses the niobium hydroxide.

Though the niobium hydroxide is available in the market, the product obtained in the market lacks performance of being changed into the columbite at low temperatures as pointed out already. The present invention, therefore, uses the fresh niobium hydroxide that is just formed.

The fresh niobium hydroxide $Nb(OH)_5$ is obtained by dissolving the commercially available niobium hydroxide in oxalic acid, adding the ammonium aqueous solution thereof to form a precipitate, separating the precipitate by filtration and washing it well. The freshness degree of the niobium hydroxide can be evaluated in terms of the solubility in sulfuric acid as mentioned earlier.

Among the preparation conditions for obtaining fresh niobium hydroxide used in the present invention, attention should be given particularly to the direction of reaction, pH after the reaction and the reaction temperature.

The niobium hydroxide of niobium oxalate precipitates at a pH of 5 or higher. From the standpoint of removing oxalic acid radicals by washing, however, it is desired to precipitate the niobium hydroxide at a pH of 7 or higher, and preferably at a pH of from 7.5 to 9.0, and more preferably at a pH of from 8.0 to 8.6. As the pH becomes 10 or higher, it becomes difficult to filtrate and wash the precipitate.

The reaction temperature ranges from 20° to 50° C. and, preferably, from 30° to 40° C. As the reaction temperature becomes higher than 60° C., the polymerization degree in the unit structure of the niobium hydroxide increases though its details are not obvious, and the primary particles become coarse, causing the niobium hydroxide to lose freshness which is contemplated by the present invention.

As the oxalic acid, there is used an oxalic acid solution having a concentration of 0.5 to 1N and in which the commercially available niobium hydroxide is dissolved in such an amount that the weight of niobium hydroxide is from 50 to 100 g/l and, particularly, from 60 to 70 g/l. The niobium hydroxide may be dissolved at room temperature or, as required, being heated up to about 90° C.

The ammonium aqueous solution is added to the niobium solution such that the pH of the solution becomes preferably 7 or higher as described above, whereby the fresh niobium hydroxide is formed as a precipitate. The niobium hydroxide is washed to such a degree that the oxalic acid radicals become as small as possible and, generally, to such a degree that the amount of the oxalic acid radicals becomes smaller than 0.05% by weight with respect to the niobium pentoxide.

The niobium hydroxide prepared under the above-mentioned conditions maintains the freshness as specified by the present invention because the filtered cake which is filtered and washed is the hydrated niobic acid or the hydrated niolium acid that can be easily turned into a slurry again with simple stirring.

Synthesis of Columbite

The fresh niobium hydroxide should be in the form of an aqueous slurry having a concentration of niobium pentoxide of from 1 to 20% by weight and, particularly, from 5 to 10% by weight, and should be used for the preparation of a columbite precursor.

Any divalent metal can be used as a metal acetate provided it is capable of forming a columbite-type niobate with niobium hydroxide. Examples include metals of the iron group such as Fe, Co, Ni and the like, metals of the group II of periodic table such as Mg, Zn, and the like, as well as Cr, Mn, In, Cu and the like. Among these metals, magnesium is suited for accomplishing the object of the present invention. The metal acetate is used in a stoichiometric amount sufficient for forming the columbite in order to prepare a precursor.

The precursor is usually prepared by dropwisely adding an aqueous solution of a metal acetate to the fresh slurry of niobium hydroxide with stirring and further adding the ammonium aqueous solution thereto. There is no particular limitation on the concentration of the metal acetate aqueous solution provided the mixing can be homogeneously effected. The concentration, however, should range from 1 to 10% by weight. The mixing can be sufficiently effected at room temperature but may be effected being heated up to about 60° C.

According to the present invention, it is also important to add the ammonium aqueous solution to the precursor slurry in addition to adding the metal acetate from the standpoint of facilitating the formation of the columbite through calcining at a low temperature. Ammonia is used in an amount greater than an equivalent with respect to the acetic acid component in the metal acetate that is used. When the amount of ammonia is too great, side reaction takes place during the calcining. Therefore, ammonia should be used in such an amount that the pH of the mixture solution is from 7 to 10.4 and, particularly, from 9 to 10.

As required, the obtained mixture solution is heated at a temperature of 30° to 80° C., and is spray-dried to form a powdery precursor. That is, the powder that can be calcined at a low temperature is not obtained when the mixture solution obtained above is dried by an ordinary means, but a precursor that can be calcined at a low temperature is obtained when the water content is removed instantaneously. The spray-drying is carried out by spraying the mixture solution into the hot air stream which is usually heated at 150° to 400° C. and, particularly, at 180° to 300° C. though it may vary depending upon the spraying amount.

According to the present invention, the powdery mixture, i.e., the precursor obtained by the above-mentioned process is changed into a columbite-type niobate. When the precursor is calcined, the volatile components in the mixture are all decomposed and removed, and the niobium component react with the metal component to form columbite-type crystals. In the case of the present invention, the transition starts at such a low temperature as 500° to 900° C., and the transition into crystals is saturated at about 800° to 900° C.

It is generally desired that the calcining is carried out at 500° to 1100° C. and, particularly, at 500° to 900° C.

for 0.5 to 4 hours and, particularly, for about 2 to 3 hours.

Thus, according to the present invention, there is formed a columbite of the general formula (1), $$MO_{m/2} \cdot Nb_2O_5$$

wherein M is a divalent or trivalent metal, and m is a valency of the metal M.

FIGS. 1(a), 1(b), 1(c) and 1(d) are graphs showing the crystal transition temperature of a columbite-type niobate ($MgNb_2O_6$) of the present invention and the X-ray diffraction pattern thereof.

Being obtained by calcining the precursor having a homogeneous composition at a low temperature, the columbite-type niobate of the present invention features primary particles of fine diameters, i.e., having an average primary particle diameter of generally from 0.05 to 0.5 μm and, particularly, from 0.1 to 0.2 μm as observed by using an electron microscope.

In the columbite which is just calcined, the primary particles are aggregated to some extent forming secondary particles having an average particle diameter of from 0.8 to 3 μm which, however, can be pulverized to easily obtain particles of submicrons in sizes.

Figure 2:
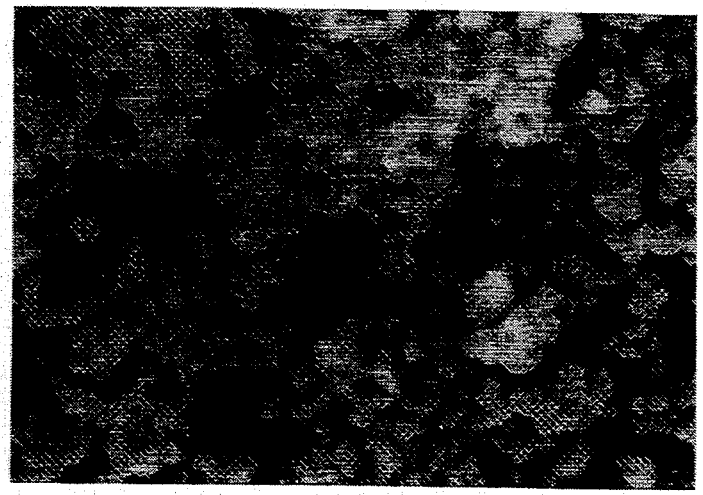
FIG. 2 is an electron microphotograph of a magnification of 15,000 times showing the structure of particles of the columbite-type magnesium niobate calcined at 900° C. of the present invention.

FIG. 2 is an electron microphotograph (magnification of 15,000 times) showing the structure of particles of the columbite-type magnesium niobate ($MgNb_2O_6$) calcined at 900° C. of the present invention.

Figure 4:
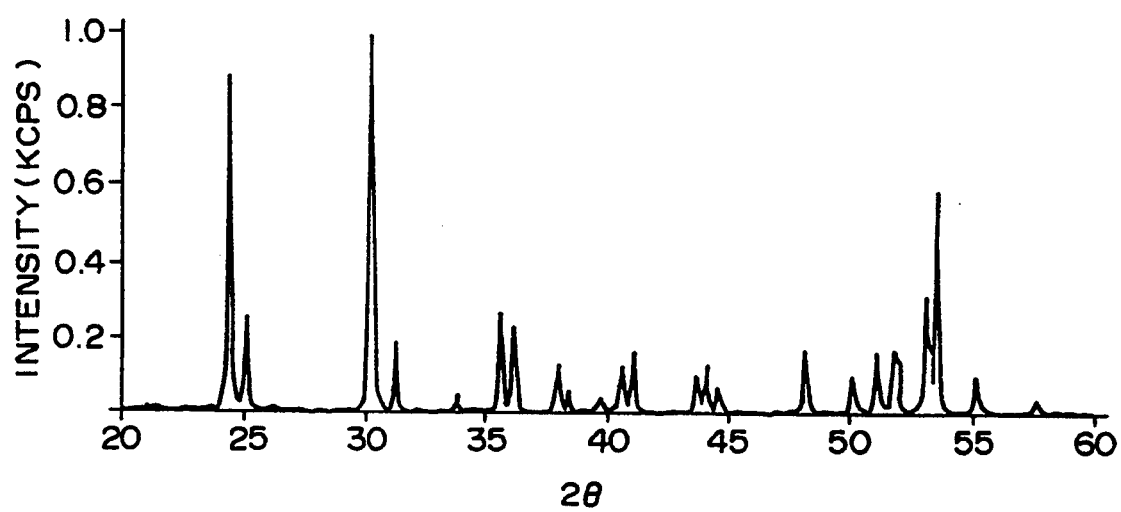
FIG. 4 is an X-ray diffraction pattern of the product calcined at 900° C. of FIG. 2.

FIG. 4 is a diagram of an X-ray diffraction pattern of the $MgNb_2O_6$ calcined at 900° C. according to the present invention.

Figure 3:
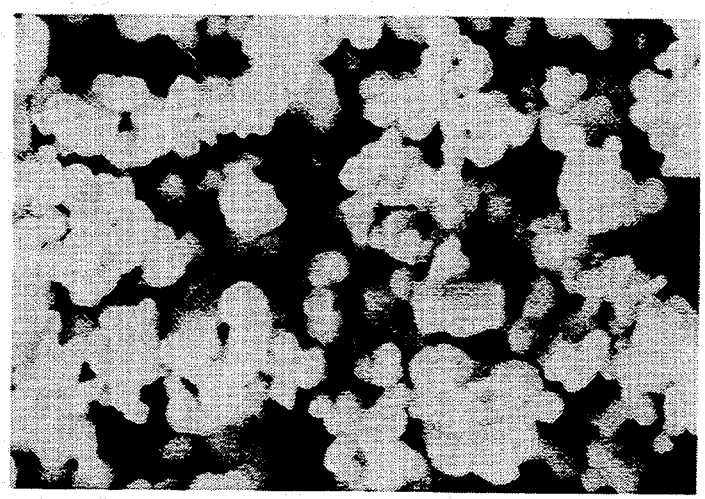
FIG. 3 is an electron microphotograph of a magnification of 15,000 times showing the structure of particles of an $MgNb_2O_6$ calcined at 1200° C. according to a conventional solid-phase process.
Figure 5:
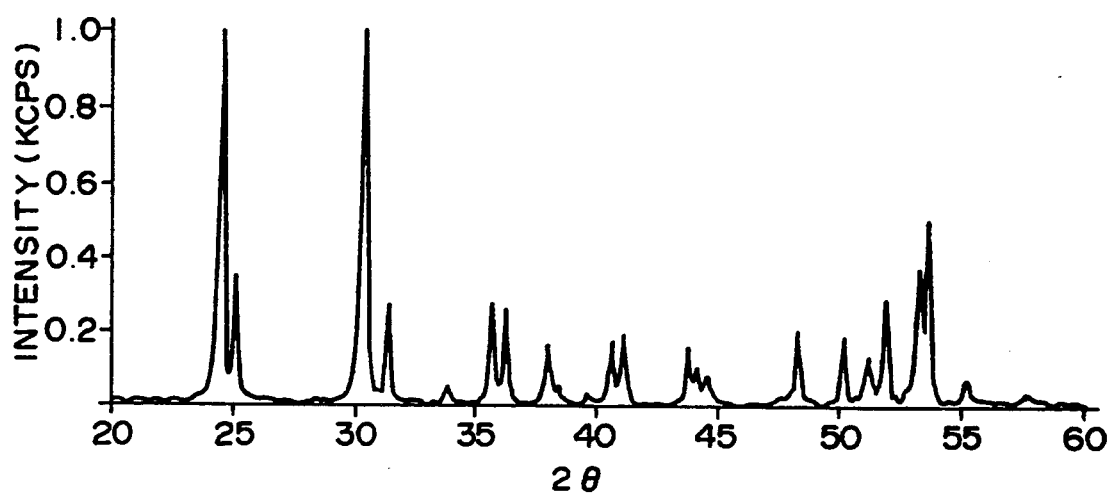
FIG. 5 is an X-ray diffraction pattern of the product calcined at 1200° C. of FIG. 3.

FIGS. 3 and 5 are, respectively, an electron microphotograph (magnification of 15,000 times) showing the structure of particles of the $MgNb_2O_6$ calcined at 1200° C. according to the conventional solid-phase process and an X-ray diffraction pattern thereof.

Synthesis of Perovskite-Type Compound

The columbite-type niobate according to the present invention intimately mixes with lead oxide at a stoichiometric ratio, and from which a perovskite-type compound can be obtained through the calcining at a temperature which is considerably lower than that of the prior synthesizing process. That is, the intimate mixture of the niobate and the lead monoxide can be changed into perovskite at a temperature as low as from 500° to 1100° C. though it may vary depending upon the kind of the metal, and the transition into crystals tends to be saturated at 800° to 1000° C. The sintering which is necessary for forming a ceramic such as a dielectric should generally be carried out at 800° to 1100° C. and, particularly, at 850° to 1000° C. for 1 to 3 hours and, particularly, for about 1.5 to 2 hours.

According to the conventional solid-phase process, the sintering must be effected at 1000° to 1200° C. as will be described later.

Figure 6:
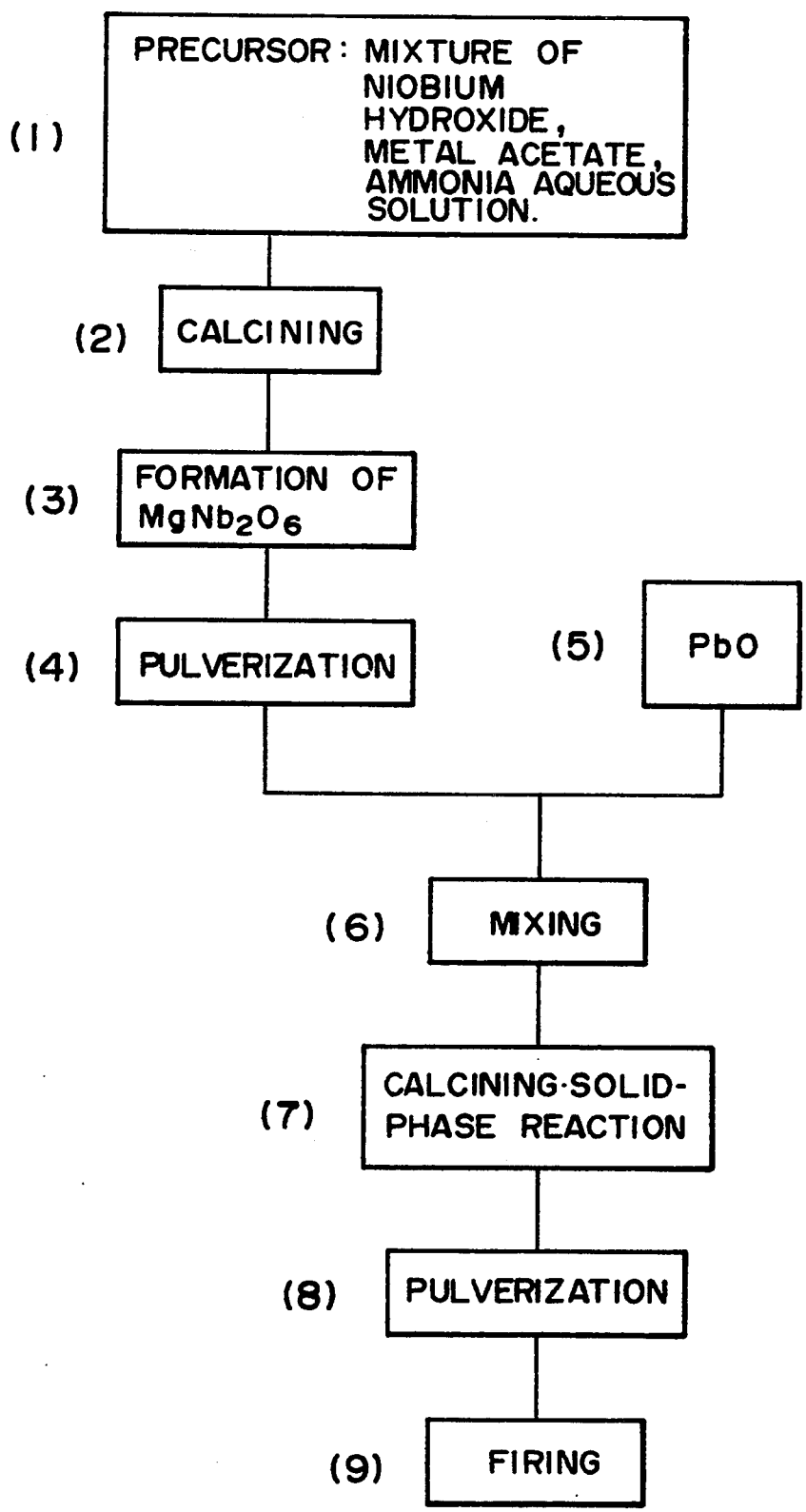
FIG. 6 is a flowchart for synthesizing a niobium-containing lead-type perovskite compound using the synthetic columbite-type niobate of the present invention and for obtaining a sintered product thereof.

FIG. 6 is flowchart for synthesizing a niobium-containing lead-type perovskite compound using the columbite-type niobate of the present invention and for obtaining a sintered product thereof.

Figure 7:
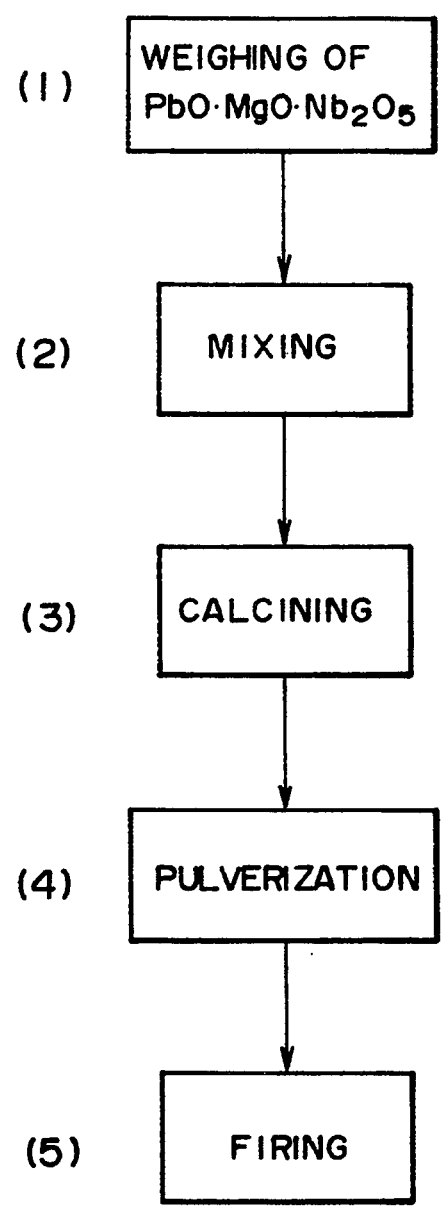
FIG. 7 is a flowchart for synthesizing a niobium-containing lead-type perovskite compound by the conventional solid-phase process and for obtaining a sintered product thereof.

FIG. 7 is a diagram illustrating the steps for synthesizing a niobium-containing lead-type perovskite compound by the conventional solid-phase process and for obtaining a sintered product thereof.

When the two are compared with each other, the conventional process comprises mixing single components consisting of lead component, niobium component and M component, and reacting them in solid phase to obtain a perovskite compound (PMN, etc.).

The present invention is based on the multi-stage wet-type process in which a precursor of $MgNb_2O_6$ consisting of niobium component and M component is prepared, a columbite-type niobate ($MgNb_2O_6$) is once synthesized, lead component is then mixed thereto, and the mixture is reacted in solid phase to obtain PMN.

Figure 8:
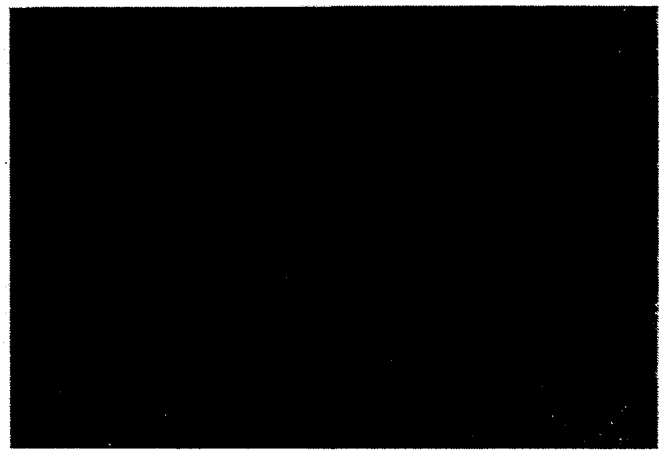
FIG. 8 is an electron microphotograph of a magnification of 2,000 times showing the structure of grain boundaries on the surface and cross section of the sintered product of the magnesium niobate-containing lead-type perovskite (PMN) of the present invention.

FIG. 8 is an electron microphotograph (magnification of 2,000 times) shows the structure of grain boundaries on the surface and cross section of the sintered product of the magnesium niobate-containing lead-type perovskite (PMN) using the columbite-type magnesium niobate of the present invention.

Figure 9:
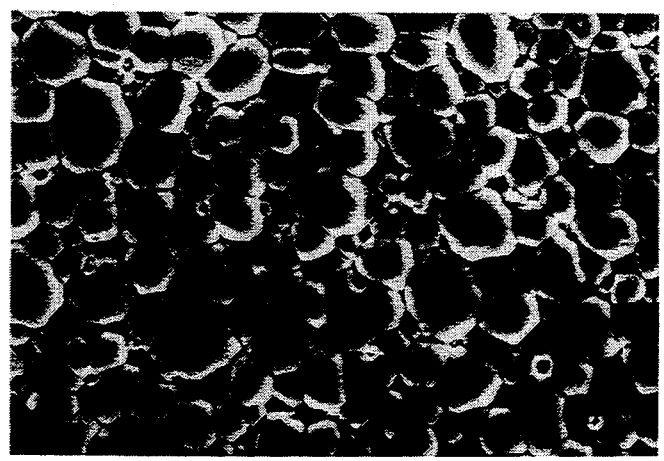
FIG. 9 is an electron microphotograph of a magnification of 2,000 times showing the structure of grain

FIG. 9 is an electron microphotograph (magnification of 2,000 times) showing the structure of grain boundaries on the surface and cross section of the sintered product of the magnesium niobate-containing lead-type perovskite obtained by the conventional solid-phase process.

As the lead oxide, there can be used a lead monoxide of the so-called litharge type or the massicot type having particle diameters of usually from 0.1 to 10 μm.

According to the present invention as will be obvious from FIGS. 8 and 9, lead monoxide volatilizes little through the calcining which is effected at a low temperature, a perovskite-type compound is obtained having a composition of a blending ratio as aimed which is entirely homogeneous and is as fine as 1 μm or smaller in particle sizes and, besides, a dense sintered product thereof is obtained having a fine texture and suppressing the growth of crystal particles.

EXAMPLES

Example 1

Described below is the synthesis of a columbite-type niobate ($MNb_2O_6$; M is a metal of the group II of periodic table of Mg, or a metal of the iron group such as Fe, Co, Ni, etc.) using fresh niobium hydroxide.

According to the present invention, the synthesis of $MNb_2O_6$ comprises a step 1 of preparing fresh niobium hydroxide, a step 2 of mixing M and Nb components, a step 3 of spray-drying and a step 4 of calcining.

Step 1: Preparation of fresh niobium hydroxide

A commercially available $Nb(OH)_5$ cake (hereinafter referred to as starting material No. NH-2) is weighed such that the amount is 132.91 g reckoned as $Nb_2O_5$, and deionized water and 332.28 g of oxalic acid [$(COOH)_2 \cdot 2H_2O$] are added thereto to prepare 2858.2 g of an acidic aqueous solution of oxalic acid containing 5% by weight of $Nb_2O_5$. To this solution is added 6 mol/l of ammonium aqueous solution until pH reaches 8 while cooling the solution such that the temperature does not exceed 40° C., so that the niobium hydroxide is precipitated. The obtained slurry is filtered and is washed with 1% of acetic acid aqueous solution of which the pH has been adjusted to 8 with the ammonium aqueous solution in order to prepare a fresh slurry of niobium hydroxide [$Nb(OH)_5$] for use in the present invention having an $Nb_2O_5$ concentration of 5.00% by weight and an oxalic acid radical concentration of smaller than 0.05% per the niobium pentoxide.

TABLE 2

| Reaction process | ammonia is added to acidic niobate aqueous solution of oxalic acid. |
|---|---|
| pH of alurry after the reaction | 7 or higher, preferably 8 to 8.5. |

TABLE 2-continued

| Reaction process | ammonia is added to acidic niobate aqueous solution of oxalic acid. |
|---|---|
| Reaction temperature | 20 to 60° C, preferably 20 to 40° C. |

Among the conditions for preparing the fresh niobium hydroxide shown in Table 2, what are particularly important are the pH after the reaction and the reaction temperature.

As shown in Table 2, the niobium hydroxide starts precipitating at a pH of 4 or higher. From the standpoint of removing the oxalic acid radicals by washing, however, the pH should be 7 or higher and, preferably, 8 or higher.

The reaction temperature should preferably be from 20° to 40° C. As the reaction temperature becomes 70° C. or higher, the polymerization degree of the unit structure of the niobium hydroxide increases though the details are not known, and the freshness is not accomplished as contemplated by the present invention and the reactivity becomes poor.

The starting materials Nos. N-1, N-3, N-4 and N-5 shown in Table 3 prepared under the above-mentioned conditions are the fresh niobium hydroxides specified by the present invention that completely dissolve in 6N sulfuric acid, and the filtered cakes thereof that are just filtered and washed can be said to be the hydrated niobic acid that can be easily turned into a slurry again with simple agitation.

Here, for instance, the starting material No. NH-1 obtained by drying the niobium hydroxide of the starting material No. N-1 with the air at room temperature, fails to exhibit freshness that is contemplated by the present invention, and becomes a niobium hydroxide that does not completely dissolve in 6N sulfuric acid.

The starting material NH-2 which is a commercially available niobium hydroxide does not almost dissolve.

TABLE 3

| Starting material No. | Starting Mg salt | pH after reaction | Reaction temp. °C. | Freshness | Acid radical* % by wt. | Quality of starting material |
|---|---|---|---|---|---|---|
| N-1 | oxalate | 8 | 30 | ○ | 0.1 or less | best |
| N-2 | " | 8 | 70 | X | 0.1 or less | poor |
| N-3 | " | 9 | 55 | ○ | 0.1 or less | good |
| N-4 | " | 7.5 | 25 | ○ | 0.1 or less | best |
| N-5 | " | 6 | 30 | ○ | 1 or more | poor |
| NH-1 | " | 8 | 30 | X | | poor |
| NH-2 | " | 8 | | XX | | poor |

*per niobium pentoxide

The qualities of the starting materials in Table 3 are evaluated in terms of the formation rate of columbite of the columbite-type niobate obtained through the step 4 described below and the presence of niobium oxides other than the columbite.

For instance, the magnesium-niobium system using the starting material No. N-1 forms 100% of columbite [MgNb$_2$O$_6$] when fired at 900° C. When the starting materials Nos. N-2, N-5 and NH-1 are used, however, the columbite [MgNb$_2$O$_6$] is formed at a rate of 60 to 78% through the firing at 900° C. When the starting material No. N-5 is used, furthermore, niobium oxides are contained.

Step 2: Mixing of M and Nb components

To 2658.2 g of the Nb(OH)$_5$ slurry [0.5 mol as Nb$_2$O$_5$] obtained in the step 1 is added 403.1 g of magnesium acetate [Mg(CH$_3$COO)$_2$] which has, as an M component, an MgO concentration of, for example, 5% by weight, followed by the addition of 6 mols/l of ammonium aqueous solution until the pH reaches 10, thereby to prepare a mixture slurry which is a precursor of the columbite-type niobate consisting of Mg and Nb components. The above-mentioned pH region is from 7 to 10.5 and, preferably, from 9.5 to 10.

Step 3: Spray-drying

The precursor slurry consisting of Mg and Nb components obtained in the step 2 is spray-dried under the conditions of an inlet temperature of 260° C. and an exit temperature of 90° C. in order to obtain an amorphous powder having a composition MgNb$_2$O$_6$ of the columbite-type.

Step 4: Calcining

The amorphous powder of, for example, MgNb$_2$O$_6$ obtained in the step 3 is calcined at 500° to 900° C. for two hours to obtain columbite-type crystalline MgNb$_2$O$_6$ which are the samples Nos. MN-1 to MN-6 and MN-8 of the present invention shown in Table 4.

In Table 4, the samples Nos. MN-7, MN-9 and MN-10 are those of the Comparative Examples.

According to the present invention, the freshness of the niobium hydroxide and the formation rate of the columbite are determined by the testing processs described below.

Testing Processs

1. Freshness of niobium hydroxide

To 40 ml of 6N sulfuric acid are added slurries containing 0.5 g of niobium hydroxide reckoned as niobium pentoxide [Nb$_2$O$_5$] followed by sufficient stirring. Those which completely dissolve as observed by naked eyes are regarded to be fresh ones and marked with an open circle, and those which do not completely dissolve are regarded to be poorly fresh ones and are marked with X.

2. Formation rate of columbite

The formation rate of columbite is calculated in compliance with the following relation based on the powder X-ray diffraction process using the strongest diffraction line peak of an index of a plane (040) of the niobium pentoxide and the strongest diffraction line peak of an index of a plane (131) of the columbite [MgNb$_2$O$_6$], $$\text{Formation rate of columbite} = \frac{I_{(MN)}}{I_{(MN)} + N_{(N)}}$$

$I_{(MN)}$: peak intensity of the diffraction line of an index of a plane (131) of the columbite [MgNb$_2$O$_6$],
$I_{(N)}$: peak intensity of the diffraction line of an index of a plane (040) of the niobium pentoxide.

Comparative Example 1

A magnesium niobate was synthesized in the same manner as in Example 1 with the exception of using a magnesium oxalate instead of using the magnesium acetate in the step 2 of the sample No. MN-1 of Example 1, followed by firing at 900° C. The formation rate of the columbite was 60%.

Example 2

A columbite-type crystalline FeNb$_2$O$_6$ which is the sample No. FM-1 was prepared in the same manner as in Example 1 with the exception of adding, instead of the magnesium acetate, 718.5 g of an aqueous solution of ferrous acetate having an FeO concentration of 5% by weight prepared in a non-oxidizing atmosphere in the step 2 of Example 1.

Example 3

A columbite-type crystalline CoNb$_2$O$_6$ which is the sample No. CM-1 was prepared in the same manner as in Example 1 with the exception of adding, instead of the magnesium acetate, 749.4 g of an aqueous solution of cobalt acetate having a CoO concentration of 5% by weight in the step 2 of Example 1.

TABLE 4

| Sample No. | Niobium hydroxide | Starting salt of M component | pH of precursor slurry | Calcining temp. | Formation rate of columbite-type niobate (%) |
|---|---|---|---|---|---|
| MN-1 | N-1 | Mg(CH$_3$COO)$_2$ | 8 | 900 | 100 |
| MN-2 | " | " | 9 | 900 | 100 |
| MN-3 | " | " | 10 | 500 | 100 |
| MN-4 | " | " | 10 | 900 | 100 |
| MN-5 | " | " | 10 | 1100 | 100 |
| MN-6 | " | " | 10.4 | 900 | 98.5 |
| MN-7 | " | " | 10.5 | 900 | 78.5 |
| MN-8 | " | " | 7 | 900 | 92 |
| MN-9 | NH-1 | " | 10 | 900 | 75 |
| MN-10 | NH-2 | " | 10 | 900 | 60 |
| CM-1 | N-1 | Co(CH$_3$COO)$_2$ | 9 | 900 | 100 |
| FM-2 | " | Fe(CH$_3$COO)$_2$ | 8 | 900 | 100 |

Example 4

By using the columbite-type magnesium niobate, columbite-type ferric niobate and columbite-type cobalt niobate obtained in Examples 1 to 3, the perovskite-type dielectric ceramic materials which are composite perovskite-type compounds having composition formulas Pb(Mg$_\frac{1}{3}$Nb$_\frac{2}{3}$)O$_3$, Pb(Fe$_\frac{1}{3}$Nb$_\frac{2}{3}$)O$_3$ and Pb(Co$_\frac{1}{3}$Nb$_\frac{2}{3}$)O$_3$ were prepared in accordance with the procedures described below, and were compared with those prepared by the conventional solid-phase process to examine their electric characteristics.

(1) The precursor of a columbite compound prepared by using the fresh niobium hydroxide of the present invention was spray-dried and was calcined at 500° to 1100° C. for 2 hours to obtain a crystalline columbite-type compound having particle diameters which are as fine as 1 μm or smaller.

(2) The obtained columbite-type crystalline product was pulverized, and the lead oxide powder (PbO) was weighed into a predetermined amount.

(3) By using the zirconia balls, the product weighed in (2) above was wet-type mixed for 15 to 20 hours using pure water as a solvent.

(4) After dehydrated and dried, the mixture was calcined at a temperature of 600° to 750° C. for 2 hours to carry out the reaction in the solid phase to prepare a perovskite-type dielectric material.

(5) The thus prepared sintered perovskite-type dielectric material was coarsely pulverized in an alumina mortar, and was wet-pulverized by using zirconia balls with pure water as a solvent, followed by drying.

(6) An aqueous solution containing 13% by weight of a polyvinyl alcohol was added in an amount of 10% by weight and was homogeneously mixed. By using a metal mold having a diameter of 12 mm, the mixture was molded under a molding pressure of 300 Mpa, heated at 500° to 600° C. for 2 hours to remove the binder, and was sintered at 850° to 1100° C. for 2 hours in a magnesium ceramic container that was hermetically sealed to minimize the evaporation of lead component at high temperatures.

Finally, the thus obtained perovskite-type dielectric ceramic material was coated with a silver electrode and was fired.

To make sure the thus prepared product of the columbite-type salt, the MgNb$_2$O$_6$ precursor obtained through the multi-stage wet-type process calcined at 900° C. was confirmed by using a powder X-ray diffraction apparatus and the obtained calcined powder was observed using an SEM apparatus (scanning electron microscope).

As will be understood from the electron microphotograph (magnification of 15,000 times) of FIG. 2, the columbite-type magnesium niobate according to the present invention has powder primary particle sizes of as very fine as 0.2 μm or smaller and in which the mother phase peak in the columbite phase is established as is obvious from the X-ray diffraction pattern of FIG. 4.

As a Comparative Example, furthermore, the starting materials of MgO powder and Nb$_2$O$_3$ powder were mixed together using a ball mill and were calcined at a temperature of 1200° C. and were reacted in the solid phase to synthesize an MgNb$_2$O$_6$ salt by the conventional solid-phase process.

FIG. 5 shows the results of analysis by using the powder X-ray diffraction apparatus wherein peaks are mother phase peaks in the columbite phase.

FIG. 3 is an SEM photograph (magnification of 15,000 times) thereof, wherein the powder primary particle diameters are about 1 to 2.0 μm.

According to the conventional solid-phase process, the calcining must be effected at a temperature of 1000° C. or higher or, preferably, at 1200° C. to obtain a columbite-type salt of MgNb$_2$O$_6$.

According to the multi-stage wet-type process of the present invention, the calcining must be effected at a temperature of 500° C. or higher or, preferably, at 500° to 1100° C. to obtain a columbite-type salt of MgNb$_2$O$_6$.

FIG. 8 is an SEM photograph of particles (structure of grain boundaries) of a PMN sintered product of a composition Pb(Mg$_\frac{1}{3}$Nb$_\frac{2}{3}$)O$_3$ obtained by using the MgNb$_2$O$_6$ powder of the multi-stage wet-type process of the present invention. The particles shown in this photograph possess diameters (grain sizes) of as fine as 1.0 μm, and the texture is homogeneous.

FIG. 9 is an SEM photograph of particles (structure of grain boundaries) of a PMN sintered product of a composition Pb(Mg⅓Nb⅔)O₃ obtained by using the powder of the solid-phase process. The particles shown in this photograph possess diameters (grain sizes) of about 4.8 μm in average, and the particle diameters vary as wide as from about 1.5 μm to 8.0 μm.

Table 5 shows specific inductivities of the composite perovskite-type dielectric materials obtained by the present invention, particle diameters of the sintered products, and sintering temperatures.

Here, the specific inductivities were calculated from the electrostatic capacitances that were measured by using an LCR meter at a frequency of 1 KHz and a voltage of 1 Vrms.

The particle diameters were measured relying upon the observation using the SEM apparatus.

According to Table 5, the sintered products of the samples Nos. 4, 5, 6, 8 and 10 are evaluated to be of good quality, and the sintered products of the samples Nos. 1, 2, 3, 7 and 9 are evaluated to be of fairly good quality.

By using the synthetic perovskite-type compound containing lead and having the above-mentioned properties of the present invention as a dielectric material, it is allowed to obtain further increased dielectric constant and homogeneous texture.

Moreover, the sintering at a temperature of as low as 950° C. or less makes it possible to reduce the cost of energy as well as to suppress the vaporization of lead component in the step of firing, to prevent the composition from varying and, hence, to obtain a ceramic such as a dielectric having uniform composition.

We claim:

1. A process for producing a columbine-type niobate of the formula $$MO_{n/2} \cdot Nb_2O_5$$

wherein M is a divalent or trivalent metal which is selected from the group consisting of Mg, Ca, Zn, Ni, Co, Fe, Mn, Cr, Cu and In, and m is the valency of the metal M, which comprises mixing an aqueous slurry of fresh niobiumhydroxide that is just formed, said niobium hydroxide having the capability of completely dissolving when added in an amount of 0.5 g as $Nb_2O_5$ to 40 ml. of 6N $H_2SO_4$, an acetate of said metal M of a stoichiometric amount with respect to the niobium hydroxide, and an aqueous ammonia solution in an amount that the pH of the resultant mixture solution is from 7 to 10.4, spray or freeze drying the resultant mixture solution to form a powdery mixture and calcining the powdery mixture.

2. A process for producing a columbite-type niobate according to claim 1, wherein the powdery mixture is calcined at a temperature of 500° C. or higher.

3. A process for producing a columbite-type niobate according to claim 1, wherein the aqueous slurry of fresh niobium hydroxide is obtained by dissolving nio-

TABLE 5

| | | Columbite-type niobate | | | Dielectric properties of perovskite compound | | |
| --- | --- | --- | --- | --- | --- | --- | --- |
| Sample No. | Composition formula of perovskite-type compound | Synthesizing method | Calcining temp. °C. | Diameter of primary particles μm | Max. specific inductivity | Average particle diameter of sintered product μm | Sintering temp. (°C.) |
| 1 | Pb(Mg⅓Nb⅔)O₃ | solid-phase method | without calcining | — | 14000 | 4.2 | 1100 |
| 2 | Pb(Mg⅓Nb⅔)O₃ | solid-phase method | 1200 | 1.8 | 16400 | 2.3 | 1050 |
| 3 | Pb(Mg⅓Nb⅔)O₃ | multi-stage wet-type method | without calcining | 0.1 | 15000 | 1.8 | 1050 |
| 4 | Pb(Mg⅓Nb⅔)O₃ | multi-stage wet-type method | 500 | 0.1 | 19500 | 0.8 | 900 |
| 5 | Pb(Mg⅓Nb⅔)O₃ | multi-stage wet-type method | 900 | 0.2 | 19500 | 0.8 | 900 |
| 6 | Pb(Mg⅓Nb⅔)O₃ | multi-stage wet-type method | 1200 | 0.6 | 18000 | 1.0 | 950 |
| 7 | Pb(Fe½Nb½)O₃ | solid-phase method | 1200 | 1.8 | 14800 | 5.2 | 950 |
| 8 | Pb(Fe½Nb½)O₃ | multi-stage wet-type method | 900 | 0.2 | 17400 | 1.8 | 850 |
| 9 | Pb(Co⅓Nb⅔)O₃ | solid-phase method | 1200 | 1.8 | 6000 | 2.8 | 1000 |
| 10 | Pb(Co⅓Nb⅔)O₃ | multi-stage wet-type method | 900 | 0.2 | 7600 | 0.6 | 900 |

According to the present invention, an aqueous slurry of a fresh niobium hydroxide that is just formed, a metal acetate, and ammonium aqueous solution are mixed together, and the mixture which is a precursor of the columbite is spray-dried and is then calcined at a relatively low temperature to synthesize a highly pure and homogeneous columbite-type niobate. The columbite-type niobate is then mixed with lead oxide and is calcined at a low temperature to yield a niobium-containing lead-type peroviskite having homogeneous composition, high purity and fine grain sizes.

Moreover, the perovskite compound yields a sintered product having dielectric properties and fine and homogeneous texture that could not be obtained by the conventional solid-phase process.

bium hydroxide in oxalic acid and adding an aqueous ammonia solution thereto to form a precipitate thereof.

4. A process for producing a niobium-containing lead-type perovskite compound comprising intimately mixing the columbite-type niobate obtained by the process for production according to any one of claims 2, 3 and 1 and lead oxide at a stoichiometric ratio, and calicining the resultant mixture.

5. A process for producing a perovskite compound according to claim 4, wherein the niobium-containing lead-type perovskite compound is a Pb(Mg·Nb)O$_3$-type compound.

6. A process for producing a perovskite compound according to claim 4, wherein the niobium-containing lead-type perovskite compound is a Pb(Fe·Nb)O$_3$-type compound.

7. A process for producing a perovskite compound according to claim 4, wherein the niobium-containing lead-type perovskite compound is a Pb(Co·Nb)O$_3$-type compound.

8. A process for producing a perovskite compound according to claim 4 wherein the resultant mixture is calcined at a temperature of 600° C. or higher.

9. A process for producing a perovskite compound according to claim 8 wherein the niobium-containing lead-type perovskite compound is a pb(MgNb)O$_3$-type compound.

10. A process for producing a perovskite compound according to claim 8 wherein the niobium containing lead-type perovskite compound is Pb(FeNb)O$_3$-type compound.

11. A process for producing a perovskite compound according to claim 8 wherein the niobium containing lead-type perovskite compound is a Pb(CoNb)O$_3$-type compound.

* * * * *